Figure 1:
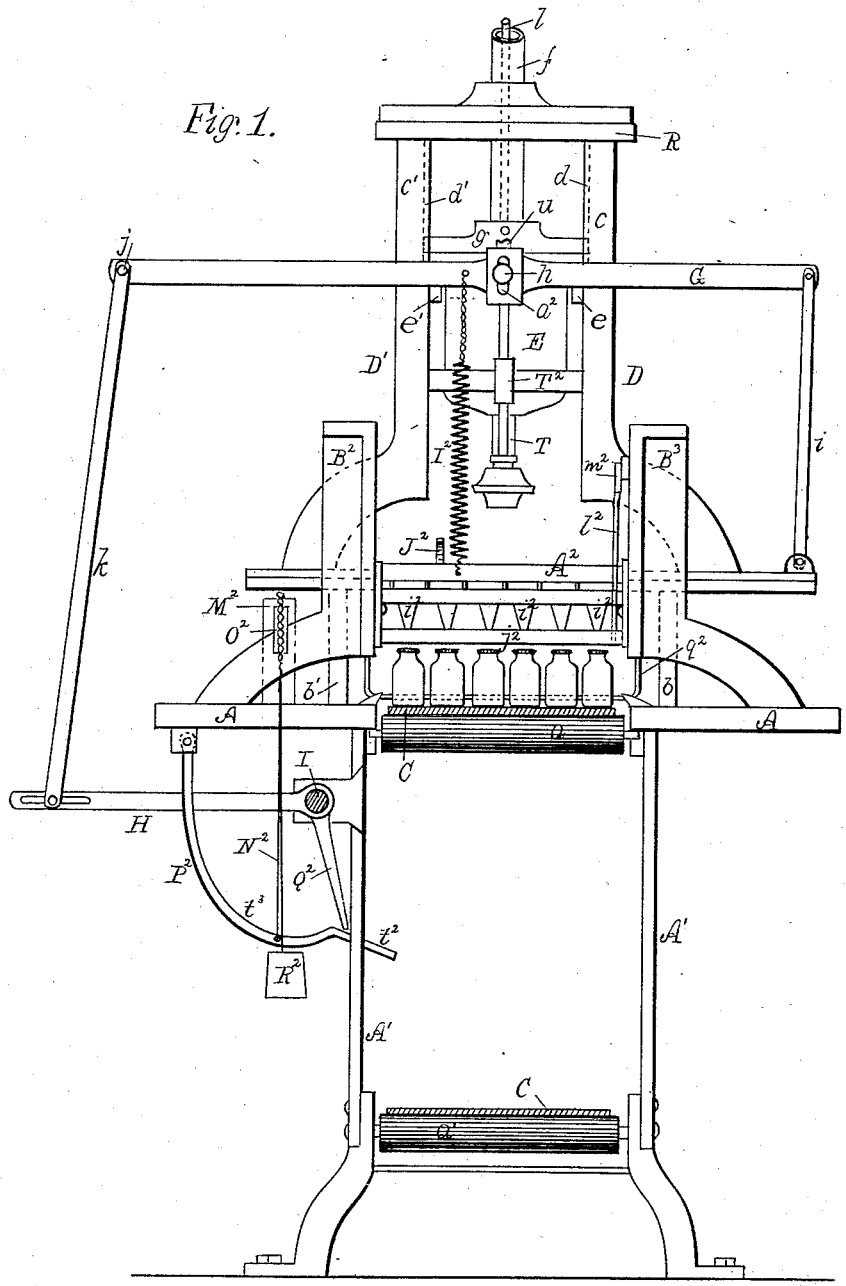

(No Model.)

E. M. WOOD & A. G. MEAD.
BOTTLING MACHINE.

No. 333,708. Patented Jan. 5, 1886.

Witnesses.
H. E. Lodge.
A. F. Hayden.

Inventors.
Edmund M. Wood.
Albert G. Mead.
F. Curtis, Atty.

(No Model.)  8 Sheets—Sheet 2.

E. M. WOOD & A. G. MEAD.
BOTTLING MACHINE.

No. 333,708.  Patented Jan. 5, 1886.

Witnesses.
H. E. Lodge.
A. F. Hayden.

Inventors.
Edmund M. Wood.
Albert G. Mead.
F. Curtis, Atty.

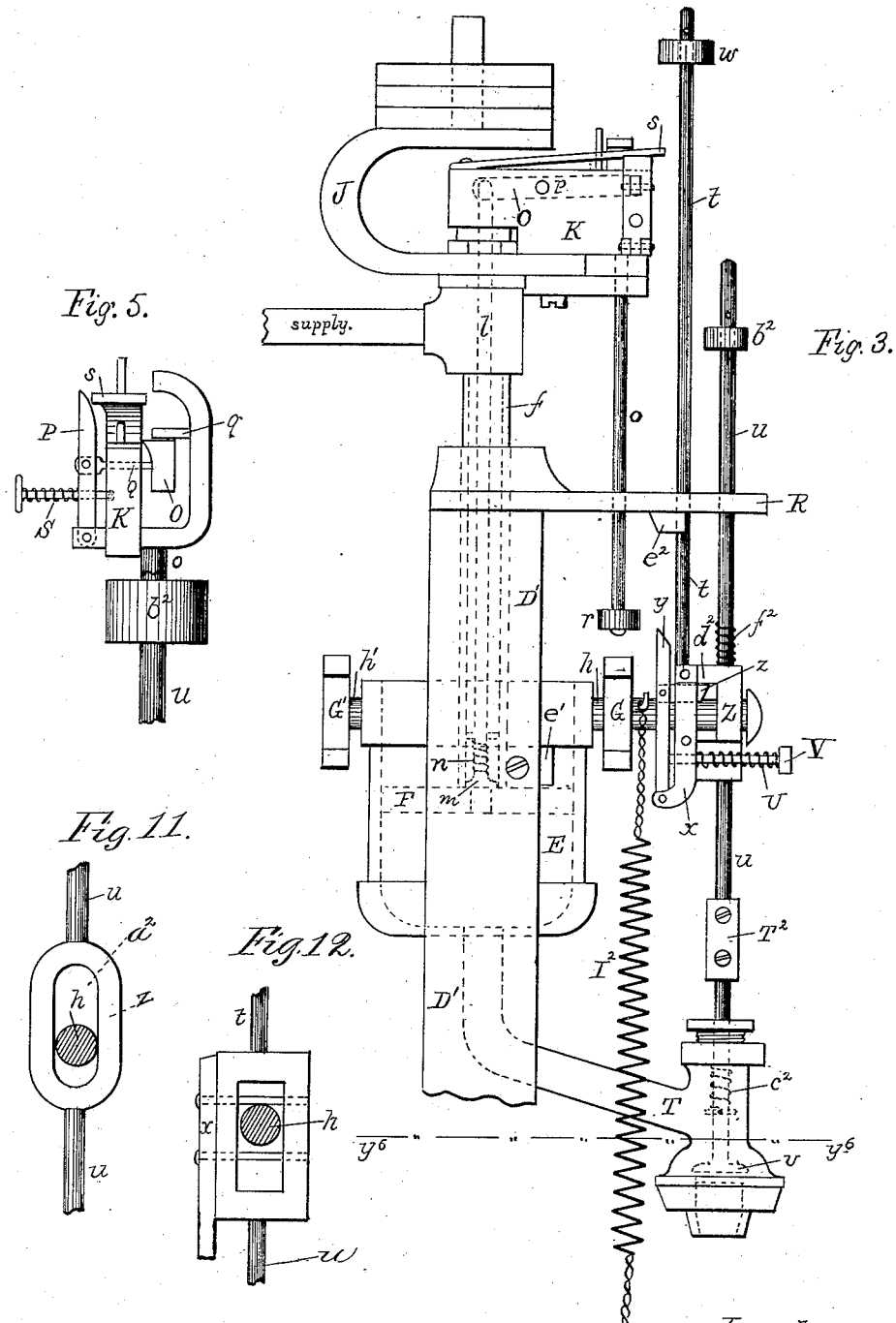

(No Model.) 8 Sheets—Sheet 4.
E. M. WOOD & A. G. MEAD.
BOTTLING MACHINE.
No. 333,708. Patented Jan. 5, 1886.
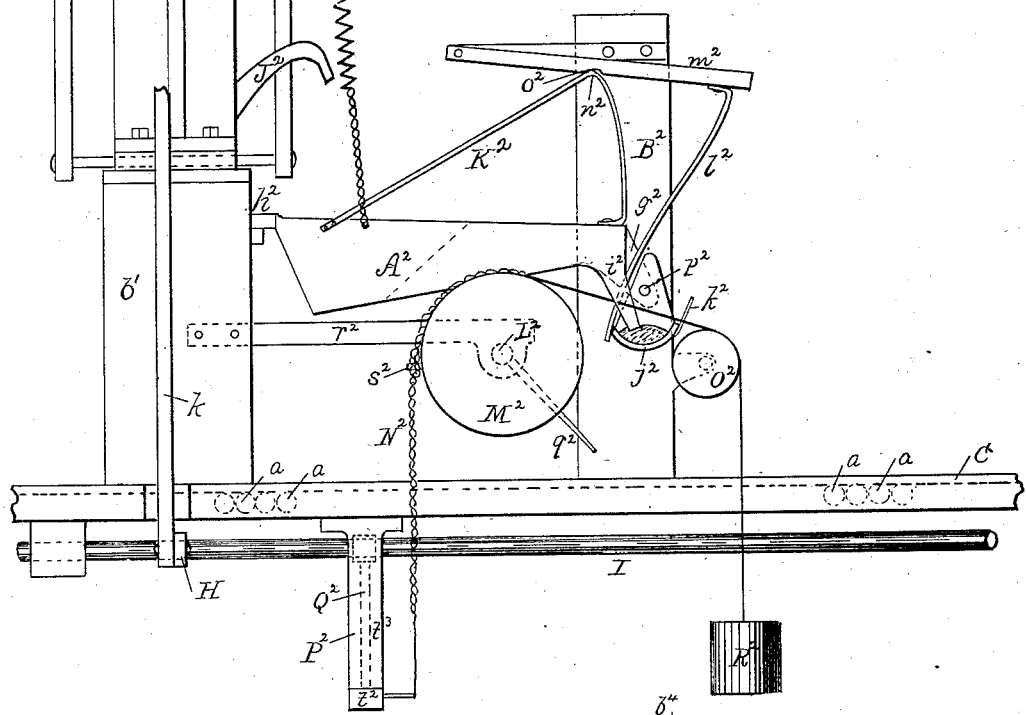

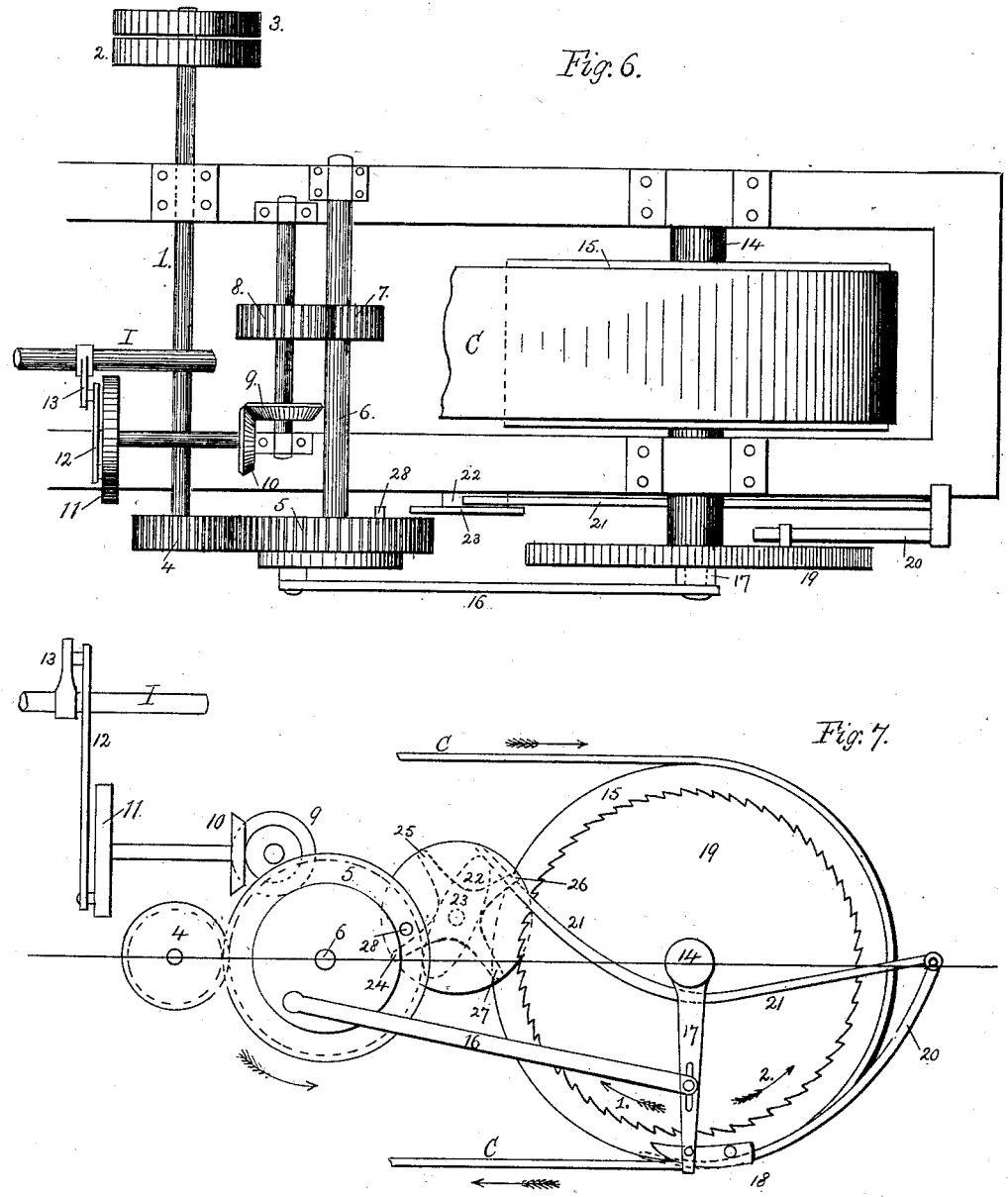

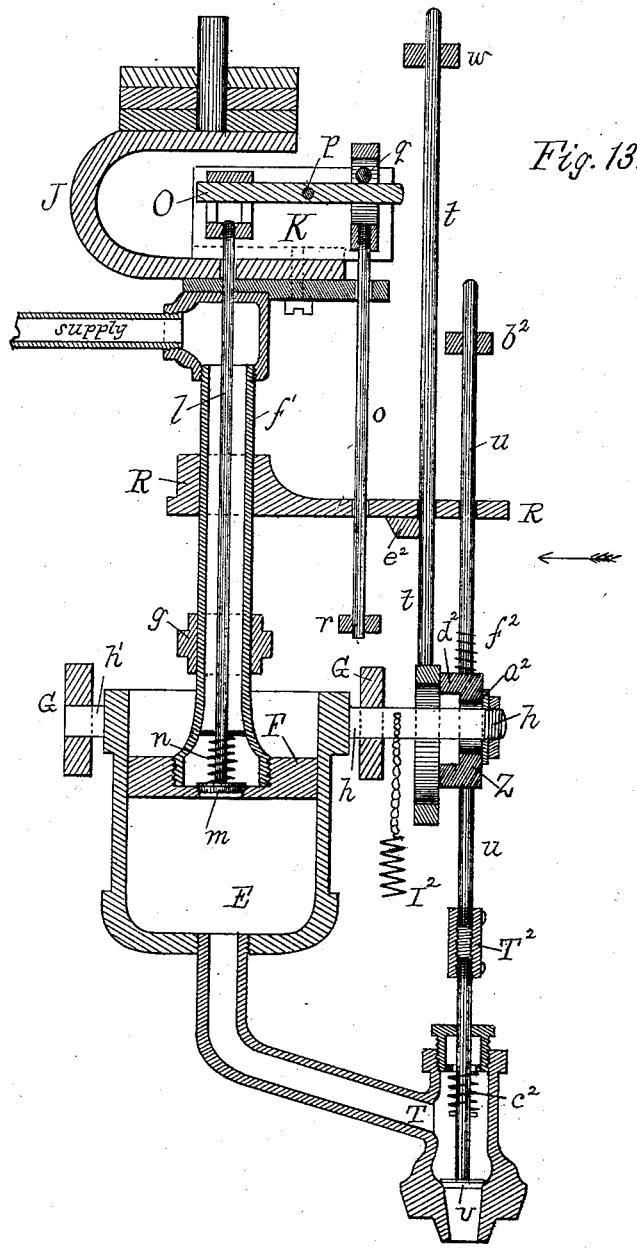

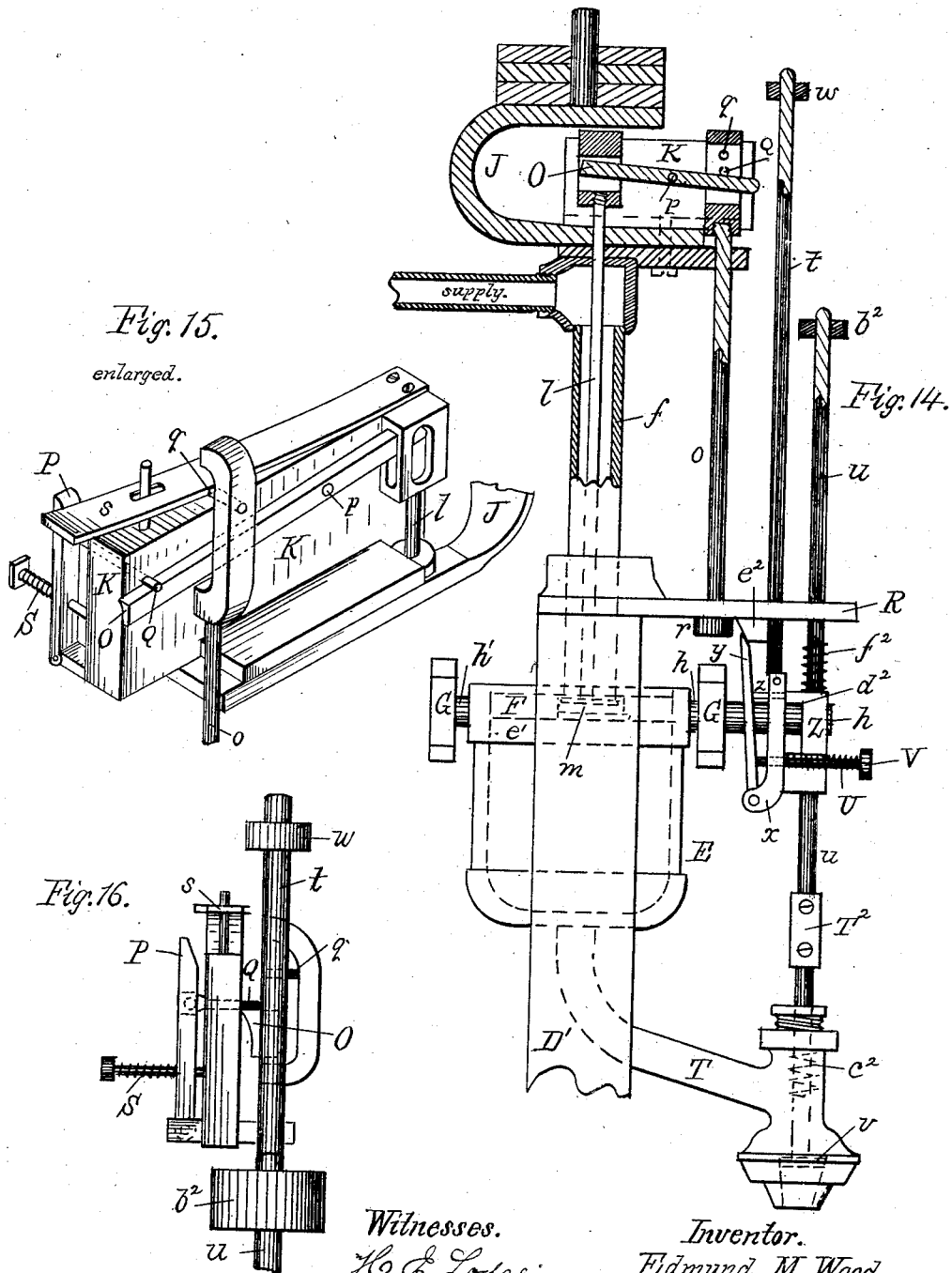

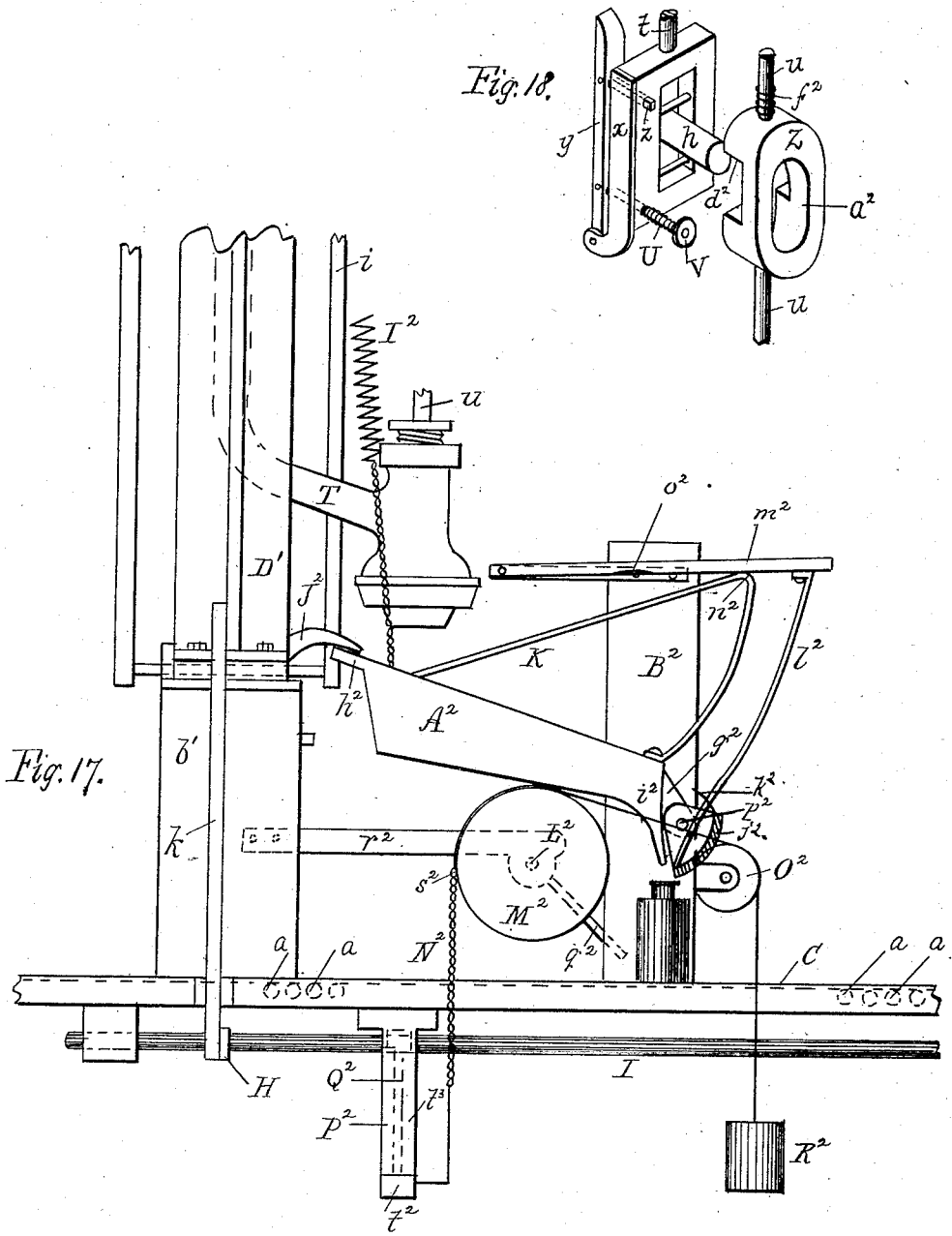

UNITED STATES PATENT OFFICE.

EDMUND MORTIMER WOOD, OF NATICK, AND ALBERT GALLATIN MEAD, OF BOSTON, MASSACHUSETTS.

BOTTLING-MACHINE.

SPECIFICATION forming part of Letters Patent No. 333,708, dated January 5, 1886.

Application filed December 17, 1884. Serial No. 150,604. (No model.)

*To all whom it may concern:*

Be it known that we, EDMUND MORTIMER WOOD and ALBERT G. MEAD, citizens of the United States, residing, respectively, at Natick and Boston, in the counties of Middlesex and Suffolk and State of Massachusetts, have invented certain new and useful Improvements in Bottling-Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to bottling-machines; and it consists in the combination, with bottle-filling mechanism, of an endless traveling apron, which constitutes a carrier for the bottles, and a drying-chamber, through which said apron travels, but is not wholly inclosed therein.

It further consists in the combination of the bottle-filling mechanism with an endless traveling apron, which constitutes a carrier for the bottles, and a shaft and finger for sweeping each row of bottles into line with the liquid-filling spouts should the initial positions of the bottles have been previously disturbed.

It further consists in the combination of an endless belt to carry one or more series of bottles, a drying-chamber arranged over said belt, the filling and measuring chamber with its operating mechanism, the tilting pan, and the corking-machine.

It further consists in a cylinder adapted to move upon and with a piston, said piston having a stroke shorter than the cylinder inclosing it, whereby upon stopping of the former the latter moves away and forms a chamber to contain the liquid delivered and discharged by valves, the opening and closing of which is effected by the movement of said cylinder upon certain operative mechanism connected with the valves.

It further consists in the spring-actuated supply-valve with its operative mechanism, consisting of shipper-bars and shoulders, in combination with a plate and a lever with its operative mechanism, whereby upon the downstroke of the cylinder a shoulder effects the closing, and the return or upward stroke, by and through another shoulder, effects the opening of said valve.

It further consists in a supply-valve contained within a piston, and a rod attached thereto and operated by a lever pivoted to a plate, in combination with a shipper-rod carrying a pin, and a spring rock-lever with its locking-finger, whereby the upward motion of the cylinder operates to press the stop against the plate, thereby to depress the said lever and open the valve at proper intervals of time by means of the said pin upon said rod.

It further consists in the operative mechanism for closing the supply-valve, consisting of a rod operated by a lever, in combination with a shipper-rod with its stop, a plate-spring, a rock-lever, a locking-pin, and a spring, whereby the downward motion of the cylinder brings the stop against the spring, to effect the release of the lever and close the valve at intervals of time.

It further consists in the combination of parts to effect the opening of the spring-actuated discharge-valve, consisting of a rod with its slotted connection upon the trunnion and the shoulder and plate, whereby motion of the valve-rod is stopped, and further advance motion of the cylinder, by means of said slot and away from the valve, effects the opening of said valve at proper intervals.

It further consists in the combination, with the discharge-valve and its operating-rod, of the spring-actuated rock-lever, its locking-finger, the lip, and ear, whereby said valve is retained open above its seat until the rise of the cylinder brings the said rock-lever against the ear, to effect disengagement of said locking-finger from said lip to close the valve at proper stated intervals.

It further consists in the combination of the piston and cylinder moving relatively to each other, with their operative mechanism, consisting of two rods, two levers, a connecting-rod, a crank, and a semi-rotary driving-shaft, whereby a variable measured amount of liquid is to be received and discharged at proper stated intervals.

It further consists in the combination, with the cylinder and the spring which raises it, of the tilting pan, its series of spouts, the supply-valve, and intermediate devices, whereby the rising of said cylinder opens said valve.

It further consists in the combination of the tilting pan, its spouts, and its operating mechanism with the swinging gravity-balanced drip-trough and its operative parts—viz., a bent rod, a bar with its mutilation, and a bent finger, whereby a sudden movement is imparted to the trough upon tilting of the pan.

It further consists in the combination, with an endless belt carrying series of bottles arranged at right angles to the course of the belt, of the reciprocating semi-rotary arm, for purposes hereinafter set forth, with its operative mechanism.

It further consists in the combination of a shaft, a rock-lever, a spring, and chain with a pulley, counterpoise-weight, a shaft, and wiper-rod, said spring, pulleys, chains, and weight to effect a proper fixed position for each series of bottles when being filled, all substantially as hereinafter set forth and claimed.

Figure 2:
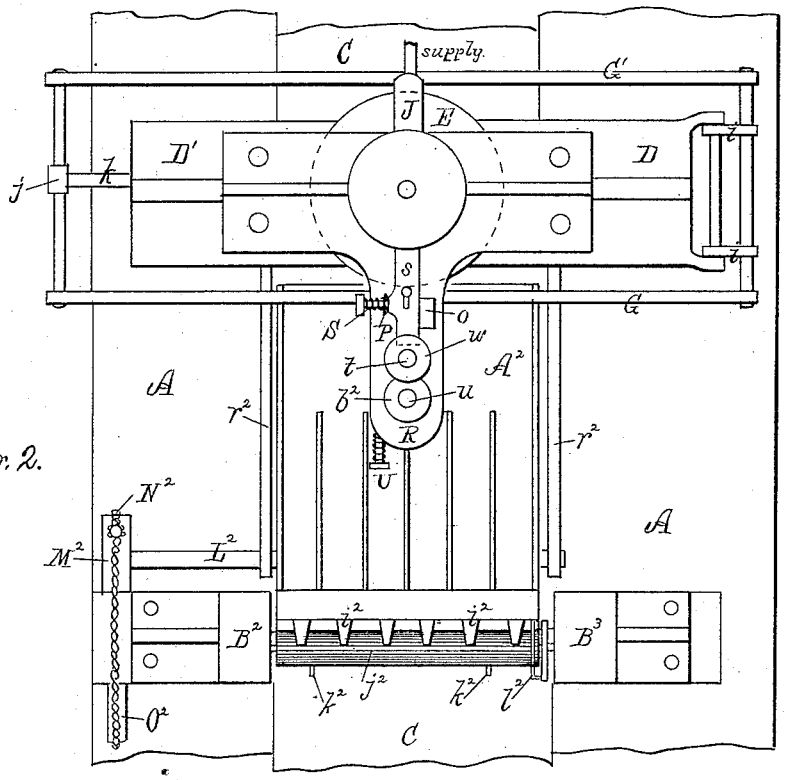
Figure 8:
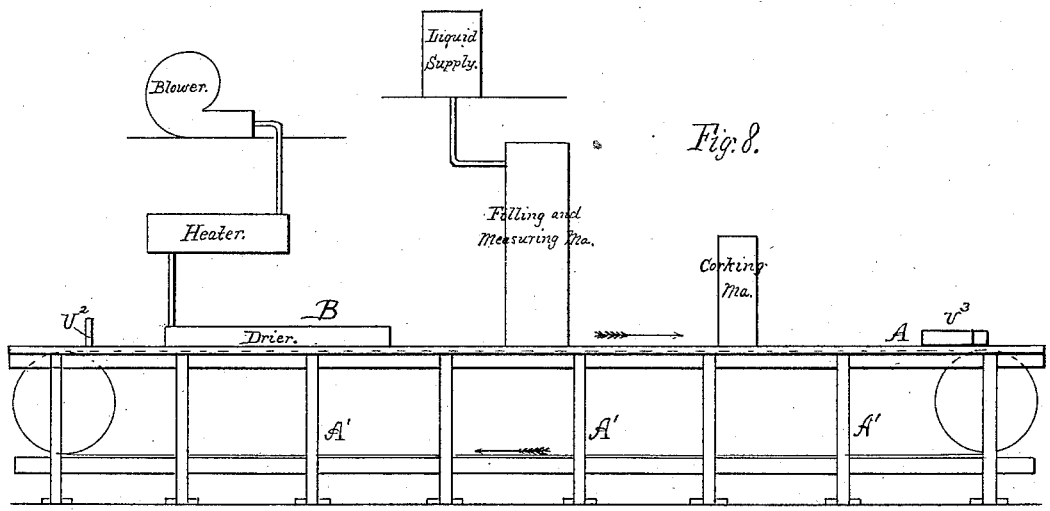

The drawings accompanying this specification represent, in Figure 1, an end elevation, and in Fig. 2 a plan, of a filling-machine embodied in our invention; Fig. 3, an enlarged side elevation of upper portion of the machine, showing the operative mechanism for the valves. Fig. 4 is a side elevation showing the lower portion with the tilting pan and its operative mechanism. Fig. 5 is an enlarged side view of the operative mechanism for the supply or inlet valve, while Fig. 6 is a plan, and Fig. 7 a side elevation, of the mechanism for intermittently operating the traveling apron or belt. Fig. 8 is a diagrammatic side elevation of the entire operating device. Figs. 9 and 10 are side and end elevations of corking-machine. Fig. 11 represents a side view of a portion of the rod $u$, looking in the direction of arrow in Fig. 13. In Fig. 12 is shown a similar view in the same direction of the rod $t$ and its plate. Fig. 13 is a view of the valve and supply-cock. Fig. 14 represents a sectional elevation of the upper and operative mechanism for actuating both the supply and discharge, and in which drawings the latter valve is closed, while the supply-valve is open. Fig. 15 is an isometric view of the mechanism operating the supply-valve, showing the relative position of such parts when said valve is open. Fig. 16 is an end view of Fig. 15, with the valve in the same position and oppositely disposed to a similar end view shown in Fig. 5 of these same drawings, in which said supply-valve is closed. Fig. 17 is a side elevation representing the pan as tilted, and with the drip-trough thrown to one side by its operative mechanism. Fig. 18 is an isometric view of the operative parts (enlarged) of the discharge-valve, with the rod $u$ and its plate $z$ removed from the pivot or shaft $h$ to show all such parts clearly.

In the drawings accompanying this specification we have shown in Fig. 8 the machine embodied as a whole with supporting-table at A. This table is formed of a series of stands, A' A', adjusted at proper intervals, and carrying two series of rollers—an upper, $a\ a$, &c., and a lower, $a'\ a'$, &c. These upper rollers are so adjusted relatively to the surface of the table that the belt C when resting thereon is just level with said surface, while the rollers are arranged so closely that their peripheries just clear and afford a permanent, secure, and level bed to uphold the endless belt with its weight of empty and filled bottles, the inherent stiffness of the belt alone not being sufficient.

B represents the heated passage-way, wherein the bottles are dried after being labeled. The sides of this box, open at both ends, are provided their entire length with air-passages leading from a suitable heater and connected with a pressure-blower. These passages have openings which throw a continuous current of hot air upon the bottles as they travel along with the endless belt, which is shown at C as moving upon a continuous bed of rollers, $a\ a'$, &c., which support the weight of the bottles, both filled and empty, which may rest upon it when the machine is actively employed.

The primary feature of this machine is the device for measuring off and delivering a proper amount of liquid at suitable times simultaneously to a series of bottles arranged beneath, and to prevent such bottles from being soiled or disfigured by the after-drip from the delivery tubes or spouts. This device is placed about midway of the two ends of the table A, centrally over the endless belt, and is supported by two standards, D D', which are formed of two parts, $b\ b'\ c\ c'$, the latter being provided with ways or guides $d\ d'$ and shoulders or stops $e\ e'$, for purposes hereinafter to be described, and united by the horizontal plate R.

E represents a cylinder closed at the bottom, being open at the top, and adjusted to travel in vertical paths of movement upon the guides $d\ d'$.

F represents a piston, which is fitted tightly within the cylinder E and moves intermittently, at one portion of the stroke moving with the cylinder, while during the remainder of said stroke it is stationary. This last operation is effected by making the stroke of the piston shorter than that of the cylinder, and is caused by attaching a guide plate or yoke, $g$, securely to the piston-rod $f$. This plate on the downward stroke of the piston comes against the shoulders $e\ e'$ and prevents further progress, while the cylinder continues its downward path, moving away from the head F, which remains stationary, and thereby a chamber is formed for the reception of a fixed amount of liquid, which may be varied, when desired, to be afterward discharged at a proper time into the empty bottles beneath.

To effect proper movement of the cylinder

E we have formed on its upper outside edge diametrically opposite two trunnions, h h', upon which are pivoted twin rocker-arms, G G', moving outside of the standards D D'. These arms are pivoted at one end to upright rods i i', attached to the foot c of the standard D, while their other ends are united by a cross-bar, j, attached to the connecting-rod k, the latter being adjustably fixed to the reciprocating arm H, which is securely fastened to the driving-shaft I, located upon the front side of the machine. Hence movement of the shaft I will effect a raising and lowering of the arm H, and consequent similar motion of the cylinder and its piston-head. The piston-rod f is a hollow tube, which serves as a supply-pipe, and also contains the valve-rod l, which operates the valve m in the piston-head F. When open, this valve acts against a spring, n, which normally retains it closed. Attached to the upper part of the piston-rod and above the supply-inlet is a goose-neck, J, supplied with weights, to effect a positive movement of the piston and compel it to follow and move with the cylinder until the shoulders e e' compel it to stop. To effect a proper opening and closing of the inlet-valve m we have secured to the lower part of the goose-neck J a vertical thin rectangular plate, K, while to the back side of said plate, pivoted at p, is a lever, O, one end of which is secured to the upper end of the valve-rod l, and the other and free end upholds a pin, q, attached to the curved upper portion of a shipper-rod, o. The latter, with the shoulder r secured at its lower end, operates to open the valve by means of a plate-spring, s, spring-actuated rock-bar P, and its locking-finger Q. (See Figs. 3 and 5.)

The operation of opening the inlet or supply valve m is as follows, (see Fig. 3:) It being understood that the piston-head, with its rod f and all the parts attached and moving therewith, is at rest, when the cylinder, rising, reaches the yoke g, attached to said rod f, when the piston-head and all its operative parts rise together, being lifted by the cylinder against the pressure of the weights upon J, the shipper-rod o also rises, being lifted by its pin q, which rests on the lever O, until the shoulder r on its lower end strikes the plate R, attached to the upper parts of the standards c c', when further motion thereof is arrested. The cylinder and piston-head, still rising, lifts the plate K, and the shoulder r being fixed and immovable, this movement depresses the free end of the lever-arm O by means of the pin q, which lifts and opens the valve m, with its rod l, against the pressure of the spring n until the free end of said lever is below the level of the locking-finger Q, attached to the spring-actuated rock-lever P. The locking-pin Q, under pressure from the spring S, projects over the top edge of the lever, locks the latter, now depressed, and retains the valve m open until further downward motion of the cylinder and piston requires it to be closed. This closing operation by means of the shipper-arm t will be hereinafter described in connection with the downward motion of the cylinder.

We have previously mentioned the two trunnions h h', supporting the cylinder and conveying movement thereto. The trunnion h, as seen in Fig. 3, and located upon the front side of the machine, is considerably longer than its mate, and serves to support two shipper-rods—the one t for closing the supply-valve m at the required time, and the other, u, both for closing and maintaining open the outlet-valve v, situated in the discharge-cock T, attached by a hollow bent arm to the lower part of the cylinder, this arm being curved to bring the discharge-orifice of cock T over the tilting pan, to be described. The bar t is provided with a shoulder or stop, w, at its upper end, while its lower portion, (see Fig. 12,) where it is attached to the trunnion h, is rectangular in shape and provided with a long oblong notch or slot, to receive the trunnion, which is confined therein between two pins. Upon the front side of this shoulder is securely bolted a plate, x, to which is hinged a rock-lever, y. This lever is provided with a locking-pin, z, upon its upper part, projecting through the plate x, while its lower portion is actuated by a spring, U, whose tension is exerted against the plate x and upon the head of a long pin, V, attached to x, and tends to keep the rock-bar y in a vertical position, with the locking-pin projecting through to engage the plate Z, (see Fig. 11,) forming the central portion of the shipper-bar u, which is attached thereby to the trunnion h. This plate Z is formed with a long slot or opening, $a^2$, to admit of further slight movement of the cylinder when the shipper-bar u has ceased to move down, owing to contact of the stop $b^2$ on said bar against the plate R, the latter acting as a guide and stop for the two bars t and u, which slide through proper openings formed in said plate.

The operative functions of these various parts, as above described, are as follows, the parts being represented, as shown in Fig. 3, with the supply-valve m open and the cylinder E moving downward, having left the piston-head F stationary: The supply of liquid may be from a tank or barrel arranged at a proper level above the filling-machine, and as the cylinder moves away from the head, the valve m being open, a vacuum tends to form and draws the liquid through the supply-pipe, down the piston-rod f, through valve m, whence it flows in and fills the space between the piston-head F and the bottom of the cylinder E as the latter advances downward, and likewise fills the bent pipe and discharge-cock T, the valve v being closed and normally retained so by the pressure of a spring, $c^2$. The cylinder continues to advance until the stop w on shipper-bar t strikes the flat spring s, which is depressed and wipes against the rock-lever P, moving it outward against the pressure of the spring S, and at the same time withdraws the stop-pin Q from its position upon the top of lever O. Instantly the tension of the spring $n$ on the valve-rod $l$ is allowed to exert itself, and the supply-valve is at once closed, lifting in its descent the free end of the lever O, attached to the upper part of the valve-rod $l$. The downward stroke of the cylinder continues, carrying both shipper-bars $t$ $u$, until the stop $b^2$ on the latter strikes the plate R, when its further motion is arrested, and with it the outlet-valve $v$, which is secured to its lower end. A slight advance of the cylinder further carries the discharge-cock T away from the valve $v$, compressing the spring $c^2$, and the liquid is free to flow into the tilting pan $A^2$, and the stroke of the cylinder is completed; but it will be noticed that when the shipper-rod $u$ has been stopped the further movement of the shipper-rod $t$, with the cylinder E, carries the locking-pin $z$ down past the lip $d^2$, when the spring U exerts its function, and the pin engages said lip to prevent the closing of the valve $v$ upon the upward return-stroke of the cylinder. The locking-pin $z$ has engaged with the lip $d^2$, formed upon the plate Z; hence return movement of the valve $v$, by means of the intermediary spring $c^2$, prevents closing of the valve upon its seat and it remains open, while the rise of cylinder and its consequent approach toward the stationary piston-head tends to exclude and force out all the liquid received on the previous downstroke. The valve $v$ retains the same relative position to its seat as the cylinder rises, and the two rods $t$ and $u$ move with the cylinder up until the top of the cylinder E strikes the yoke $g$ of the piston-rod $f$, when the piston and its operative parts rise, including the rod $o$.

The upward movement continuing, the top of the rock-lever $y$ wipes against the inclined face of the lip $e^2$ and forces said lever with its locking-pin $z$ away and disengages it from the spur $d^2$ on the bar $u$. At this point the coiled spring $f^2$, which has been compressed against the under side of the plate R, exerts its force simultaneously with the spring $c^2$, and the valve $v$ is instantly closed, the spur $d^2$ passing down below the locking-pin $z$. No sooner has this closed than the action of the stop $r$ upon the shaft $o$ has depressed the plate-spring $s$ by the continued upward movement of the cylinder E, and the supply-valve is at once opened. It will be observed that the adjustment of the parts is such that the liquid has a chance to drain off while the cylinder rises, and that the discharge-valve $v$ is closed just prior to the opening of the supply-valve $m$, a more detailed account of which operation has just previously been described.

The tilting pan is shown at $A^2$ as adapted to receive and retain a certain amount of liquid from the discharge-cock T until the proper moment, when it is delivered into the bottles, which stand ready to receive it. This pan is shown as suspended above the endless belt at a sufficient distance to allow of free passage of the bottles beneath, and pivoted at $g^2$ $g^2$ to a pair of short vertical arms or standards, $B^2$ $B^3$, secured to the table A and to one side of the filling-machine. This pan is so constructed that as it rests on two supports, $h^2$ $h^2$, its upper edge is horizontal or level, while the bottom slants at an angle, in order to form a pan with the deepest portion at the rear, to retain the liquid from the valve $v$ prior to the tilting of the pan. The front portion is provided with a series of spouts, $i^2$ $i^2$, &c., as many as there may be bottles to be filled simultaneously, while each spout is separated from the one next contiguous by a short partition, to more equally subdivide the entire contents before it is entirely delivered to the spouts.

To effect a proper tilting of the pan both as to degree and time, we have attached a coiled spring, $I^2$, at one end to the rear of the pan $A^2$, and the other to the arm G, supporting the cylinder. Therefore, when the cylinder rises, it does not affect the pan until after the contents have been discharged into the pan, when the upward motion lifts the pan by means of the chains attached to the springs until it strikes the horn $J^2$, which prevents further tilting of said pan, while the tension of the spring holds it firmly against said horn, and at the same time the expansion and yielding of the spring, as the upward motion of the cylinder continues, does not affect the motion of the latter.

To prevent the drip from the several delivery-spouts $i^2$ $i^2$, &c., soiling and disfiguring the bottles beneath, and also from wetting the endless belt, we have attached a semicircular drip-trough, $j^2$, provided with depressions or noses corresponding to the spouts $i^2$ $i^2$, &c., that when tipped the drippings may be delivered into the bottles, together with fresh liquid. This trough extends the width of the belt, and is provided with two fingers, $k^2$ $k^2$, to limit its throw.

The operative mechanism consists of a bent rod, $l^2$, affixed to the free end of an arm, $m^2$, pivoted to the standard $B^3$ and operated by the bent arm $K^2$, which is attached to one side of the pan $A^2$. Furthermore, the under side of the arm $m^2$ is formed with a curved slot, $o^2$, in which the bend $n^2$ normally rests. The rise of the rear end of the pan thrusts the bend $n^2$ against the slot $o^2$, which movement gives a rapid upward motion to the end of the lever $m^2$, and the rod $l^2$ is pressed against the lower portion of the trough $j^2$. As the trough is pivoted at $p^2$ and weighted below the pivot, gravity tends to keep it in its normal position upward, as shown in Fig. 4, under the spouts, except when retained in a tipped position during the interval when $n^2$ rests upon the contact portion of $m^2$. Upon return of the pan $A^2$ the point $n^2$, reaching the slot $o^2$, enters and again allows a sudden and rapid movement of the arm $m^2$, with its rod $l^2$, away from the trough, which instantly rotates and assumes its normal position. The disposition of parts is such that the trough is tipped just prior to the flow of the liquid from the pan into the spouts; hence the liquid is free to run into the bottles, while simultaneously therewith the trough is delivering its drip to the bottles. The return of the trough $j^2$ by its gravity-weight is so sudden that no drip can escape from the spouts $i^2$ $i^2$, &c., as it passes under them.

We have found by experience that the endless belt, when loaded with a large number of bottles, both filled and empty, has a tendency upon being stopped to sag or draw back, and the bottles consequently are not left exactly under the spouts; hence the former are disfigured, not completely filled, and liquid is wasted. To overcome this difficulty and compel each series of bottles to assume a certain fixed position every time beneath the spouts $i^2$ $i^2$, we have attached a bent finger, $q^2$, the width of the belt, to a shaft mounted in suitable brackets, $r^2$ $r^2$. To operate this finger I have secured to the front end of the shaft $I^2$ a pulley, $M^2$, provided with a stud, $s^2$, upon its periphery. Upon this pulley and attached to said stud extends a chain, $N^2$, one end of which passes over a second pulley, $O^2$, and thence down beneath the table, where it is attached to a counterpoise-weight, $R^2$. The other end passes down (see Fig. 4) and is attached to a curved flat spring, $P^2$, pivoted beneath the table, and actuated by a wiper-lever, $Q^2$, securely fixed upon the driving-shaft I. This spring is formed of two parts—an active portion, $t^2$, and an inactive or neutral portion, $t^3$. This latter portion is formed on an arc of a circle, of which the arm or lever $Q^2$ is the radius. When the rotation of the shaft I, carrying the arm $Q^2$, forces the latter against the part $t^2$ of the spring $P^2$, a sudden and rapid movement of the spring downward is effected, and by means of the chain $N^2$ effects a corresponding rotation of the pulley $M^2$ and a forward thrust of the finger $q^2$, which pushes the bottles to the exact position required. The arm $Q^2$, advancing upon the part $t^3$, effects no further movement of the parts connected therewith, but simply acts to maintain the bottles fixed while filling. Further and complete revolution of the shaft I retracts $Q^2$ from the spring, and the finger $q^2$, with its operating parts, is free to assume its normal position (see dotted lines, Fig. 4) by means of the weight $R^2$ above the top of the advancing bottles.

A short distance from the filling-machine is disposed the device for corking the bottles after being filled, and to effect this operation I have omitted some of the rolls and substituted a stout iron plate, $A^4$, the top surface of which is level with the top periphery of the rolls $a$ $a$, &c. To the standards $A'$ $A'$, I have bolted twin housings, $B^4$ $B^4$, provided with grooves, in which slides a traveling head or plunger, $C^4$, which descends and presses the corks into the bottles at the moment when the latter are at rest beneath said head, owing to the stoppage of the belt, while reciprocating movement of the plunger $C^4$ is effected by two short links, $a^4$ $a^4$, pivoted to the rod $b^4$ of the plunger $C^4$, and united to the ends of twin pivoted arms $c^4$, the latter being connected to the shaft I by crank $d^4$ and connecting-rod $D^4$.

The amount of liquid to be delivered at different times for various-sized bottles can be varied by adjusting the position of $k$ upon H, making the stroke of the cylinder longer or shorter, as is desired, and at the same time adjusting the stop $w$ on $t$ and $b^2$ on $u$ to correspond with the change in the stroke of the cylinder, raising the stops upon the shipper-rods $t$ and $u$ when the stroke is lengthened, and lowering them if shortened. The sleeve $T^2$ upon the rod $u$ is to alter the height of the valve $v$ above its seat more or less, relatively also to the stroke of the cylinder.

At that portion of the belt where the bottles are first put on a bar or rod, $U^2$, is disposed across the belt at right angles to its path of movement. The attendant places a series of bottles against this rod and upon the front side while the belt is at rest. When the belt advances, the series first placed thereon are advanced from the end the distance which the belt moves. A second series is then placed against the adjusting-bar $U^2$, when the belt again advances. The result is, that the belt is filled its entire length with series of bottles filled and empty, each series being a fixed distance apart, dependent upon the length of the advance of the belt at each movement.

The means for operating the endless apron or belt intermittently is as follows, and the operative mechanism therefor is shown in Figs. 6 and 7: In Fig. 6 we have shown the main driving-shaft at 1, with fast and loose pulleys 2 3 attached thereto. Upon the opposite end is the spur-wheel 4, meshing with a similar wheel, 5, mounted upon an intermediate shaft, 6. From this shaft semi-rotary reciprocating movement is transmitted to the shaft I by and through the spur-wheels 7 and 8, miter-gears 9 and 10, (these having the same number of teeth,) and the disk 11, with the connecting-rods 12 and 13. The endless belt C runs over the pulley 15, mounted upon a horizontal shaft, 14, revolving in suitable bearings. Intermittent motion is transmitted to the belt and its pulley by means of a connecting adjustable rod, 16, attached at one end to a circular head formed on the spur-gear 5, and at the other to a rock-lever, 17, which swings loosely upon the shaft 14. The intermittent motion of the belt is effected by and through the ratchet-wheel and its pawl, which is active and inactive at certain stated periods. This action of the pawl 18 upon the periphery of the wheel 19 is effected as follows: Two curved arms, 20 21, rigidly attached together, are loosely pivoted to the frame supporting the pulley 15. The free end of 20 rests against a stud projecting from the inner side of the pawl, which is so pivoted that its rear end is the heavier, and the tendency of the pawl is to be always active, except when held disengaged by the stud resting upon the end of the arm 20. The free end of 21 wipes over and rests upon a cam, 22, free to revolve upon a pivot secured to the stand. This cam is a flat ellipse in shape, actively operated by a star-wheel, 23, whose points 24 25 26 27 engage at intervals of time with a stud or pin, 28, secured upon the rear side of the gear 5.

The intermittent motion is effected as follows, it being understood that gear-wheel 5 has a constant movement, as likewise rod 16 and rocker-bar 17, as shown in Fig. 7: The cam 22 is now in such a position that the arm 21 rests upon it in a raised position, and arm 20 being raised likewise, the free end of 20 engages the stud and raises the rear end of pawl 18, which is now inactive, allowing the rocker-arm 17 to carry it over the periphery of the ratchet-wheel 19, which, with the belt C and its pulley 15, remains stationary. The gear 5, revolving, carries the stud 28 until it strikes the finger 24 of the star-wheel, when the latter is moved, the arm 21 passing from its raised position on the end to the side of the elliptical cam, and both arms 21 and 20 are lowered, thus leaving the pawl 18 free to assume its normal or active position, while at the same time the rocker-arm has carried the pawl with it in direction of arrow 2. This movement of the rocker-arm 7 limits the amount of throw or movement of the belt C, and is varied by adjustment of rod 16 upon the arm 17. The position of stud 28 is such that it shifts the cam just prior to the extreme throw of the rocker-arm 17, (in the direction of arrow 2,) and puts the cam and arm 20 into a position to render the pawl active; hence the moment the pawl engages the ratchet-wheel 19 the latter is forced to move, carrying the belt forward by the thrust of the rod 16 in the direction of arrow 1, when the rocker-arm and pawl return, and the stud 28, having completed one revolution, strikes the finger 27 and throws the cam into the position shown, raising the arms 20 and 21 and disengaging the pawl, which, upon its return-stroke in direction of arrow 1, moves inactively free from the periphery of its ratchet-wheel. The curve between the fingers 24 25 26 27 are arcs of circles whose radii are such as to leave one of the fingers always ready to engage the stud 28 as it revolves.

It will be readily understood that a portion of this mechanism effects semi-rotary reciprocating movement of the shaft I, which drives the filling and corking machine, and keeps them continuously and actively employed, while the mechanism last described and operated by the cam 28 is intermittent, to allow of proper intermittent motion of the belt—that is, intervals of rest for the bottles carried thereon while they are being filled and corked.

After the bottles have been corked they continue to advance upon the endless belt until they meet with a fixed bar, $v^3$, which is laid diagonally across the path of the belt, and running in the direction of the spot where the attendant stands ready to pack them in boxes. Hence, as the belt advances, the bottles are pushed against the bar, and the movement of the advancing belt carries them one side by the action of the fixed bar $v^3$ upon the surface of the receiving-table.

We claim—

1. In combination with bottle-filling mechanism, an endless traveling apron, which constitutes a carrier for the bottles, and a drying-chamber, through which said apron travels, but is not wholly inclosed therein.

2. The combination of a bottle-filling mechanism with an endless traveling apron, which constitutes a carrier for the bottles, and a shaft and finger for sweeping each row of bottles into line with the liquid-filling spouts should the initial positions of the bottles have been previously disturbed.

3. In bottle-filling machines, the combination of the endless belt to carry one or more series of bottles, a drying-chamber arranged over said belt, the filling and measuring cylinder with its operative mechanism, the tilting pan, and the corking-machine, all substantially as and for purposes stated.

4. In a bottle-filling machine, a cylinder adapted to move upon and with a piston, said piston having a stroke shorter than the cylinder inclosing it, whereby upon a stopping of the former the latter moves away and forms a chamber to contain the liquid delivered and discharged by valves, the opening and closing of which is to be effected by the movement of said cylinder upon certain operative mechanism connected with the valves, substantially as stated.

5. In a bottle-filling machine, the spring-actuated supply-valve $m$, with its operative mechanism, consisting of the shipper-bars $o\ t$ and shoulders $r\ w$, in combination with the plate K and lever O, with its operative mechanism, whereby upon the downstroke of the cylinder shoulder $w$ effects the closing, and the return or upward stroke, by and through the shoulder $r$, effects the opening of said valve, substantially as stated.

6. The supply-valve $m$, contained within the piston F, and the rod $l$, attached thereto and operated by the lever O, pivoted to the plate K, in combination with the shipper-rod $o$, carrying the pin $q$, and the spring rock-lever P, with its locking-finger Q, whereby the upward motion of the cylinder operates to press the stop $r$ against plate R, thereby to depress lever O and open the valve at proper intervals of time by means of the pin $q$ upon the rod $o$, substantially as described.

7. The operative mechanism for closing the supply-valve $m$, consisting of the rod $l$, operated by the lever O, in combination with shipper-rod $t$, with its stop $w$, plate-spring $s$, rock-lever P, locking-pin Q, and spring S, whereby the downward motion of the cylinder brings the stop $w$ against the spring $s$, to effect release of the lever, as herein described, and close the valve at intervals of time, substantially as and for purposes stated.

8. In a bottle-filling machine, the combination of the parts to effect the opening of the spring-actuated discharge-valve $v$, consisting of the rod $u$, with its slotted connection upon the trunnion $h$, and the shoulder $b^2$ and plate R, whereby motion of the valve-rod $u$ is stopped and further advance motion of the cylinder by means of said slot and away from the valve effects the opening of said valve at proper intervals, substantially as stated.

9. In combination with the discharge-valve and its operating-rod $u$, the spring-actuated rock-lever $y$, its locking-finger $z$, the lip $d^2$, and ear $e^2$, whereby said valve is retained open above its seat until the rise of the cylinder brings the lever $y$ against the ear $e^2$, to effect disengagement of locking-finger $z$ from lip $d^2$, to close the valve at proper stated intervals, as and for purposes herein described.

10. In a bottle-filling machine, the combination of the piston and cylinder, moving relatively to each other as described, with their operative mechanism, consisting of the rods $i$ $i$, levers G G', connecting-rod $k$, crank H, and semi-rotating driving-shaft I, whereby a variable measured amount of liquid is to be received and discharged at proper stated intervals, substantially as stated.

11. In combination with the cylinder and the spring which raises it, the tilting pan, its series of spouts, the supply-valve, and intermediate devices, whereby the rising of said cylinder opens said valve, substantially as set forth.

12. The combination of the tilting pan, its spouts $i^2$ $i^2$, &c., and its operating mechanism with the swinging gravity-balanced drip-trough $j^2$ and its operative parts—viz., bent rod $K^2$, bar $m^2$, with its mutilation $o^2$, and bent finger $l^2$—whereby a sudden movement is imparted to the trough upon tilting of the pan, substantially as and for purposes herein described.

13. In a bottle-filling machine, the combination, with an endless belt carrying series of bottles arranged at right angles to the course of the belt, of the reciprocating semi-rotary arm $q^2$, for purposes herein described, with its operative mechanism, substantially as described.

14. In combination, the shaft I, rock-lever $Q^2$, spring $P^2$, and chain $N^2$, with the pulley $M^2$, counterpoise-weight $R^2$, shaft $L^2$, and wiper-rod $q^2$, spring $P^2$, and the pulleys, chains, and weight, to effect a proper fixed position for each series of bottles when being filled.

In testimony whereof we affix our signatures in presence of two witnesses.

EDMUND MORTIMER WOOD.
ALBERT GALLATIN MEAD.

Witnesses:
H. E. LODGE,
A. F. HAYDEN.